April 21, 1942.   T. B. PRICKETT ET AL   2,280,081
CATALYTIC CONVERTER
Filed Jan. 18, 1939   3 Sheets-Sheet 1

INVENTORS
Thomas B. Prickett
Ernest S. Utterback
BY
Ira L. Nickerson
ATTORNEY

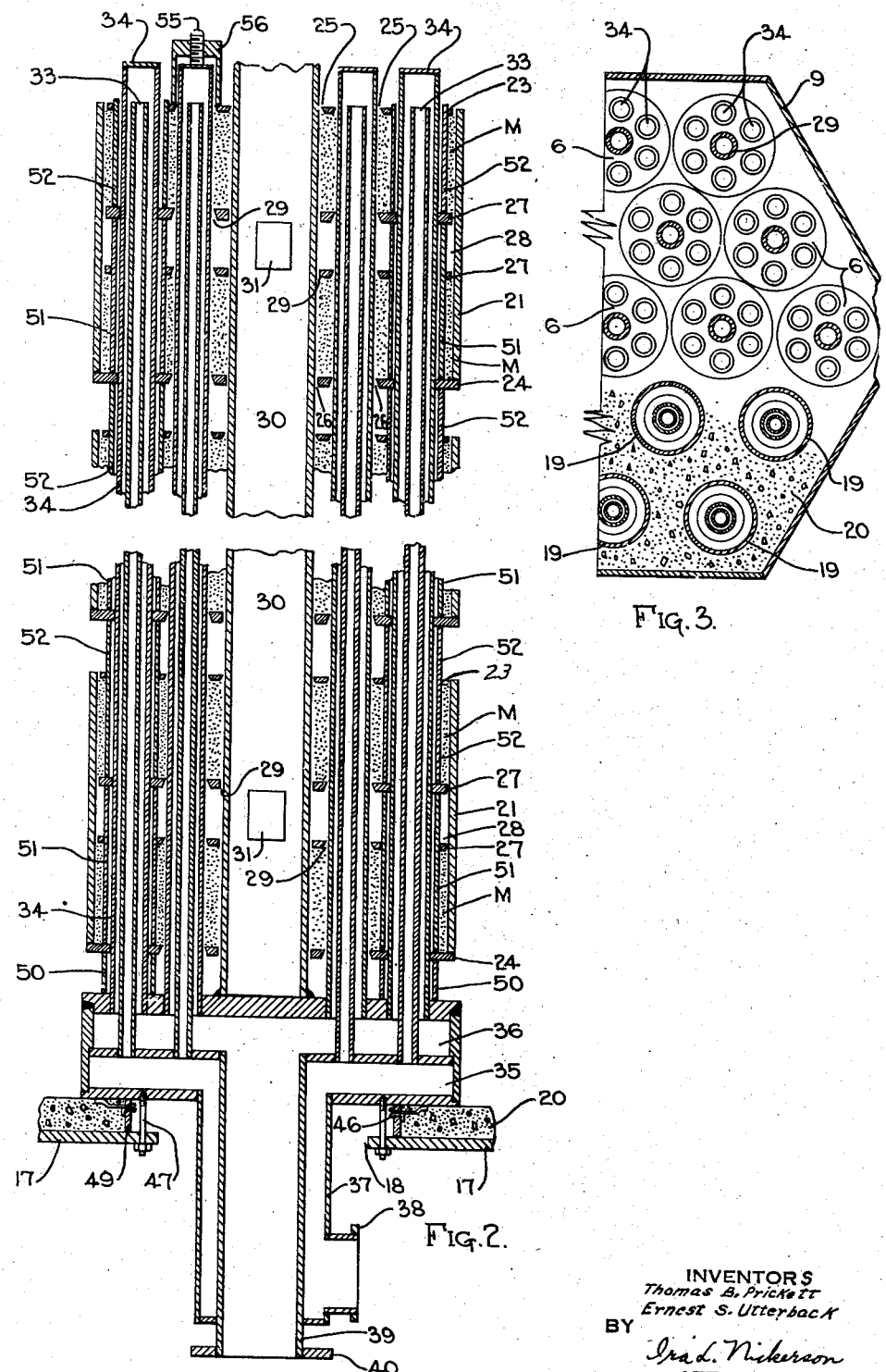

Patented Apr. 21, 1942

2,280,081

UNITED STATES PATENT OFFICE 2,280,081

CATALYTIC CONVERTER

Thomas B. Prickett, Woodbury, N. J., and Ernest S. Utterback, Oakmont, Pa., assignors, by direct and mesne assignments, to Houdry Process Corporation, Wilmington, Del., a corporation of Delaware Application January 18, 1939, Serial No. 251,508

9 Claims. (Cl. 23—288)

This invention relates to process and apparatus for carrying out physical and chemical reactions and it is especially concerned with the modification, conversion, transformation or other treatment of fluids in the presence of contact materials which may promote, enter into or in any way affect the reaction.

Reactions which are carried out in the presence of contact material disposed within a reaction chamber often present the difficult problem of maintaining all portions of the material uninfluenced by temperature conditions existing outside of the reaction chamber. Some portions of the reaction chamber are ordinarily in heat exchange relation with reactants prior to their admission to the contact material and consequently material in the vicinity of those portions will assume a higher or a lower temperature than other portions of the mass depending on the type of reaction being carried out. Similarly, other portions of the mass in the vicinity of the reaction chamber walls tend to also assume higher or lower temperatures than the interior of the mass, due to the effect of heat transfer to these portions of the mass by conduction and/or radiation from the walls of the reaction chamber.

It is a broad object of the invention, therefore, to overcome or to minimize this difficulty and to provide a converter wherein provision is made for a constant temperature in all portions of the contact material. Other objects of the invention are: to provide simplified apparatus and improved methods for controlling and carrying out reactions; to construct a converter with a plurality of similarly functioning units which may be readily removed without in any way impairing the operation of the converter; to construct a converter capable of affording even distribution of reactants to the contact material; to provide a converter having a unitary fluid manifold and reaction chamber which eliminates outside temperature influence on the contact material; and to provide for greater flexibility in the size, shape and construction of converters.

In its broad aspects, the invention contemplates a converter having an outer casing and a sealed chamber therewithin for receiving individually removable sections or units of catalyst which may be of any desired size or shape and of any selected activity. The catalytic sections or units are positioned within the chamber in a manner to form spaces or fluid passageways for receiving fluid and, preferably, the sections are separated to provide fluid spaces around all portions of each section. Each catalytic unit is also provided interiorly thereof with one or more passageways which cooperate with the spaces around the units in passing reactant fluid through the catalyst in parallel or straight through flow. Fluid may be supplied directly to the spaces around the catalytic sections for substantially simultaneous passage through all the sections from their exterior surface by means of a fluid inlet connected directly with the chamber or fluid may be fed to the interior passageways of all the catalytic sections simultaneously for passage toward the exterior of the sections by means of a manifolding chamber which is common to the passageways of all the sections. The temperature of the sections of catalyst is regulated or controlled by means of heat exchange conduits disposed therein for conveying fluid in heat exchange relation with the catalyst and these conduits are removable along with the catalytic section. Preferably each section will have a fluid inlet and outlet manifold common to the heat exchange conduits of the section and these manifolds are removable as a unit along with the heat exchange tubes. Either single passage or reverse flow may be used for the heat exchange fluid by utilizing single or nested conduits, or the heat exchange conduits of a catalytic section may be connected in series for multiple passage through the catalyst.

In order to illustrate the invention, concrete embodiments thereof are shown in the accompanying drawings in which:

Fig. 2 is an enlarged broken sectional view of a catalytic unit slightly modified in detail from that shown in Fig. 1;

Fig. 3 is a partial sectional view on the line 2—2 of Fig. 1;

Figure 1:
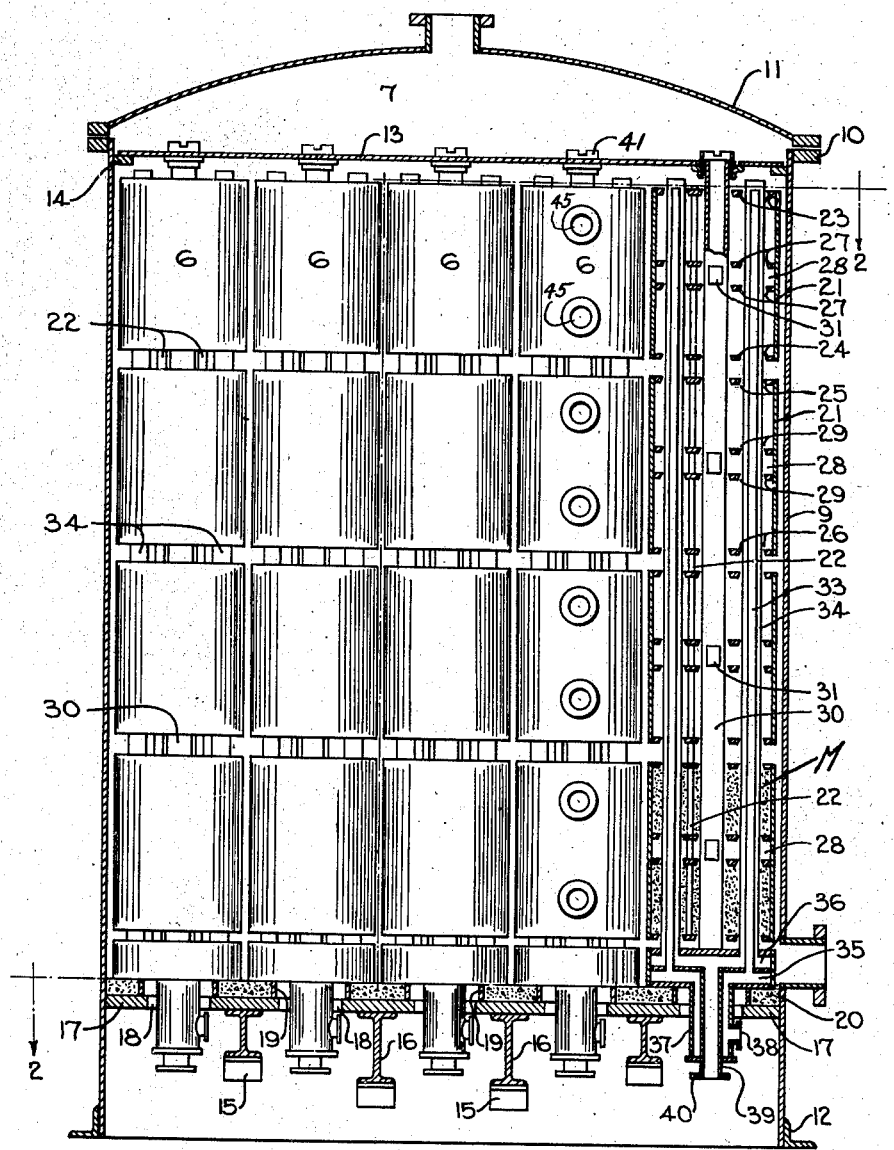
Fig. 1 is a sectional elevational view of one embodiment of the invention with a catalytic unit further sectioned to show details.

Referring to the drawings wherein similar parts in the various views will be indicated by the same numerals, in Fig. 1 the numeral 9 indicates a casing having an outwardly extending flange 10 at its upper edge to receive a cover 11 which may be removably secured thereto by suitable bolts and at its lower end the casing is similarly provided with a flange 12 for bolting or otherwise securing the casing in fixed position.

A chamber is formed interiorly of the casing and to this end an apertured tube sheet 13 is also removably secured to inwardly extending flanges 14 by suitable means and at its lower end angle brackets 15 are secured to the inner wall of the casing and are adapted to receive supports in the form of I beams 16 which extend across the casing for receiving a transverse support plate 17 having enlarged apertures 18 therein. As shown in Figs. 1 and 3, metal rings 19 are positioned on the support plate 17 to encircle the apertures 18 and receive a group of removable catalytic units 6. The spaces between the rings are filled with a concrete mixture 20 to the top of the rings to act as a filler in order to prevent the accumulation of any fluid on the support plate. The catalytic units are positioned in the chamber in spaced relation with each other and with the walls of the chamber in order to provide passageways for supplying fluid to and receiving fluid from the units. As indicated in Fig. 3 the casing 9 is of hexagonal transverse cross-section which is preferred when the catalytic units are of circular cross-section since the passageways around the units are more uniform in size. It is to be understood, however, that the casing may take any shape. The units may contain any type of contact material but for certain reactions, such as those involving the transformation, modification, conversion or other treatment of hydrocarbons, which may be derived from deposits of coal, petroleum, lignite, shale, schist, etc., the solid contact material or catalyst may be silicious in character and of natural or artificial origin and may include blends or compounds of silica and alumina with or without the addition of small amounts of other active components, such as metals or metallic compounds, the contact material being made up in the form of bits, fragments or molded pieces in order to facilitate regeneration.

The portion of Fig. 1 showing a catalytic unit in section and the enlarged detailed sectional view of Fig. 2 are similar except for a few details and will therefore be described together. The movable units 6 may take the form of a group of superposed small cells 21 which are interconnected, as shown in Fig. 1 only, by one or more ribs 22 extending longitudinally of the cells and bolted or otherwise secured interiorly or exteriorly to the side walls thereof. Each of the small cells 21 is provided in its top and bottom wall 23 and 24, respectively, with apertures 25 and 26 and interiorly of each cell transverse walls 27—27 are positioned to provide a fluid chamber 28 therebetween and a section of catalyst M between the transverse walls and top and bottom walls. The walls 27 are likewise provided with apertures 29 and the apertures of all of these walls cooperate in passing fluid in desired short paths of flow straight through the catalytic sections of each cell. In Fig. 1 only the top and bottom end walls 23 and 24 and the transverse walls 27 are rigidly secured to the side wall of each cell. A reactant fluid conduit 30 extends through each group of superposed cells and passes through the central apertures formed in all the walls of each cell, and through apertures in the transverse wall 13 communicating with a manifold 7 formed by the transverse wall 13 and removable cover 11. For supplying reactants to or removing reaction products from the cells the conduits 30 are provided with a plurality of slots 31 which are positioned in the conduits to communicate with the fluid spaces 28 in the cells.

Each unit or group of catalyst cells is provided with a separate set of heat exchange fluid tubes which are removable with the catalytic unit. As shown in the figures, the heat exchange tubes are of the reverse flow type comprising sets of nested open end inner conduits 33 and closed end outer conduits 34 which also extend through apertures in the top, bottom, and transverse walls of each cell. The outer tubes 34 and the reactant fluid conduits 30 are of sufficiently small diameter to permit fluid to pass therearound and through the apertures. A separate heat exchange fluid inlet manifold 35 and a separate outlet manifold 36 is provided for each unit of cells and, as indicated, they are also removable with each catalytic unit along with the heat exchange tubes. However, it is within the purview of the invention to provide fixed manifolds common to all the units with an arrangement of detachable connections and valves for the heat exchange tubes which will permit stopping the supply of heat exchange fluid to any unit before its removal. The inner series of conduits 33 are in fluid communication with the inlet heat exchange manifold 35 while the outer conduits 34 are in communication with the outlet heat exchange manifolds 36. Conduit extensions 37 are secured in fluid communication with the inlet manifolds 35 and are provided with flanged openings 38 which may be manifolded together for supplying heat exchange fluid simultaneously to all the inner conduits. The outlet manifolds 36 are similarly provided with conduit extensions 39 having flanged ends 40 which may also be manifolded together for withdrawing the heat exchange fluid from the tubes.

Figure 4:
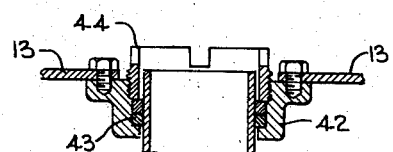
Fig. 4 is a detail of Fig. 1.

The nested heat exchange tubes 33 and 34 as heretofore mentioned and the reactant fluid conduits 30 extend through the apertures in the cell walls in slightly spaced relation with the walls to permit fluid passage through the apertures around the conduits and they are consequently in loose fitting engagement with the walls of the cells permitting desired freedom of movement for expansion and contraction of the various parts of the units. However, in order to provide a more rigid structure and prevent the conduits 30 from working up through the cells these conduits are preferably secured to the upper walls of outlet manifolds 36 as by welding and at their upper ends are provided with a packing ring assembly 41 which is shown in detail in Fig. 4 and comprises a packing ring casing 42 which is suitably fixed as by bolting to the tube sheet 13 and encloses packing rings 43 positioned in sealing engagement about the conduits and held in position by a screw retaining ring 44.

The contact material in the cells will be of sufficient size to prevent its passage through the spaces around the tubes and preferably will be formed in accordance with the teaching of Patent No. 2,078,951 issued to E. J. Houdry, May 4, 1937, wherein a molded contact material having 1 mm. penetration depth is disclosed. The contact material will be supplied to or removed from each of the cells through plugged openings 45 shown only in connection with the fourth unit from the left side of Fig. 1.

Each removable unit 6 will be positioned on one of the rings 19 with the heat exchange fluid conduit extensions 37 and 39 passing therethrough and through the apertures 18 in the bottom support plate 17 and the weight of each unit will provide a substantial seal with the rings. In Fig. 2 an arrangement for providing a positive seal is shown which is also readily adaptable for use phase, under low or high pressure. Single phase fluids, which do not or are not permitted to vaporize, include fused salts, certain metals and metal alloys. When large amounts of heat are to be supplied or removed two phase fluids such as mercury, diphenyl or water may be used.

From the above detailed description of the drawings it will be readily appreciated that the invention provides a converter structure having many advantages including a solution of the problem of contraction and expansion of parts which is a serious one when carrying out strongly exothermic and endothermic reactions in alternation in the same apparatus; for example, in the conversion of heavier hydrocarbons into lighter hydrocarbons, as in the catalytic treatment of petroleum and its distillates into marketable products, especially low boiling ones such as gasoline, when such reactions are effected in the temperature range of 775° F. to 925° F. and in the regeneration of the catalyst in situ after its activity becomes impaired through the deposit of contaminants, its initial activity being restored by the controlled oxidation or burning of the contaminants at the same or higher temperature ranging up to 1050° F.

The invention in its broad and narrow aspects has a wide field of utility in the physical or chemical treatment of organic or inorganic fluids. Some typical processes in which the invention is particularly useful are the transformation, refining or other treatment of high or low boiling hydrocarbons to produce motor fuels, fuel oils, lubricating oils and other valuable products; the hydrogenation of carbon monoxide, of hydrocarbons or their derivatives; the purification of gases by contact masses having selective adsorptive properties, the removal of impurities by chemical action, selective oxidation of hydrocarbons or their derivatives to produce organic acids or related compounds; synthesis of ammonia; the catalytic combustion of partially formed flue gases and the like; the oxidation of sulphur dioxide to produce sulphuric acid and other processes readily recognized by those skilled in the art; etc.

Although the invention has been described in connection with several preferred forms, these are to be understood only as exemplary, the invention being limited only by the scope of the appended claims.

We claim as our invention:

1. In a converter having a sealed chamber for carrying out chemical reactions and a reactant fluid manifold exteriorly thereof, a plurality of containers in said chamber for holding contact material, conduits in communication with said manifold and extending into each container, said conduits having spaced apertures therein, other apertures in the container walls cooperating with said conduit apertures in passing fluid through the containers, heat exchange units comprising inlet and outlet manifolds positioned exteriorly of the containers and heat exchange tubes extending through said containers and interconnecting said manifolds, means for loosely and removably mounting the containers and heat exchange units in spaced parallel relationship within the sealed chamber, and fluid conducting means in communication with the sealed chamber for cooperating with the reactant fluid manifold in supplying fluid to and removing fluid from the containers.

2. In a converter having a sealed chamber for carrying out chemical reactions and a reactant fluid manifold exteriorly thereof, a plurality of containers in said chamber each having side and end walls, a plurality of apertures in the end walls of said containers, a conduit in communication with said manifold and extending through an end wall of each container in loosely fitting relation therewith, said conduits being apertured within said containers and extending through the length thereof, heat exchange units comprising inlet and outlet manifolds positioned exteriorly of the containers and heat exchange tubes extending through other apertures in said container end walls in loosely fitting relation and interconnecting said manifolds, said end wall apertures and said conduit apertures cooperating to pass fluid through the containers, means for freely and removably mounting the containers in spaced parallel relationship within the sealed chamber, and fluid conducting means in communication with the sealed chamber for cooperating with the reactant fluid manifold in supplying fluid to and removing fluid from the containers.

3. A converter casing having side and end walls and a partition extending thereacross providing a sealed reactant chamber with one end wall and a reactant manifold with the other end wall, a container for contact material positioned in the sealed reactant chamber in spaced relation with its side walls, a reactant conduit extending through one end of and across said container, said conduit having one end in communication with said reactant manifold and secured to said partition in movable relation therewith, said container being apertured and said conduit having an aperture within the container for passing reactants through the contact material in said container, fluid conducting means in communication with said sealed reactant chamber for cooperating with said reactant manifold in supplying reactants to and removing reactants from said container, in combination with means for passing heat exchange fluid in indirect heat exchange relation with the contact material in the container which comprises inlet and outlet manifolds positioned exteriorly of the container and imperforate tubular members in communication with said manifolds and extending through the contact material in the container.

4. A converter for carrying out chemical reactions having a sealed reactant chamber, a container for holding contact material having side and end walls and positioned within said sealed reactant chamber, a pair of partitions extending transversely of the container providing a manifold therebetween, aligned apertures in said end and transverse walls, a reactant conduit extending through an aperture of each of said walls in loosely fitting relation therewith and having an aperture in communication with said manifold, means in communication with said sealed chamber and other means in communication with said conduit for passing fluid to and removing fluid from said container, a heat exchange unit comprising a pair of inner and outer manifolds disposed exteriorly of said container, a set of closed end heat exchange tubes extending through other apertures in said container walls, each tube having the closed end within the container and the open end in communication with the said inner manifold, and a set of open end heat exchange tubes, each having one open end within the outer tubes and one open end in communication with the outer manifold.

5. A converter for carrying out chemical rewith Fig. 1. The ring 49 is split circumferentially into two sections and a soft iron ring gasket 46 is provided for each section. The gaskets are compressed together to form a tight seal by means of bolts 47 which extend through the support plate 17 and into the lower manifold for maintaining the units in fixed position. When it is desired to remove one of the units the cover 11 and tube sheet 13 may be readily disassembled and the entire unit of catalyst cells and heat exchange conduits lifted out of the casing after the heat exchange connections are broken.

In Fig. 2 a slightly modified arrangement is provided for maintaining the catalytic cells of each unit in superposed spaced relation and interconnecting them for removal as a unit while permitting relative movement of the various cell parts. This construction differs from that of Fig. 1 in that only the lower end wall 24 of each cell is rigid with the side walls of the cell while the inner transverse walls 27 and upper end wall 23 are arranged to float within the cell. For this purpose a series of sleeves are positioned around some of the outer heat exchange tubes 34 to act as supports and as shown in the lower portion of the figure, short sleeves 50 are positioned on the upper manifold wall and receive the lower end wall 24 of the cell for supporting the cells 21. Long sleeves 51 then are supported by the lower end wall 24 and pass through the lower transverse walls 27 to which they are fixed, as by welding, and in turn these sleeves support the upper transverse walls 27. The latter walls in turn support long sleeves 52 which pass through the upper end walls 23 of the cells to which they are welded and these sleeves in turn support the lower wall of the next cell. Each of the superposed cells is then provided with two long sleeves 51 and 52 surrounding certain of its outer heat exchange tubes 34 to position and support its upper end wall and transverse walls. In order to form the cell units into a rigid structure and to permit their removal, certain of the outer heat exchange tubes 34 are provided at their closed ends with a screw extension 55 which is adapted to receive a locking nut 56.

Figure 5:
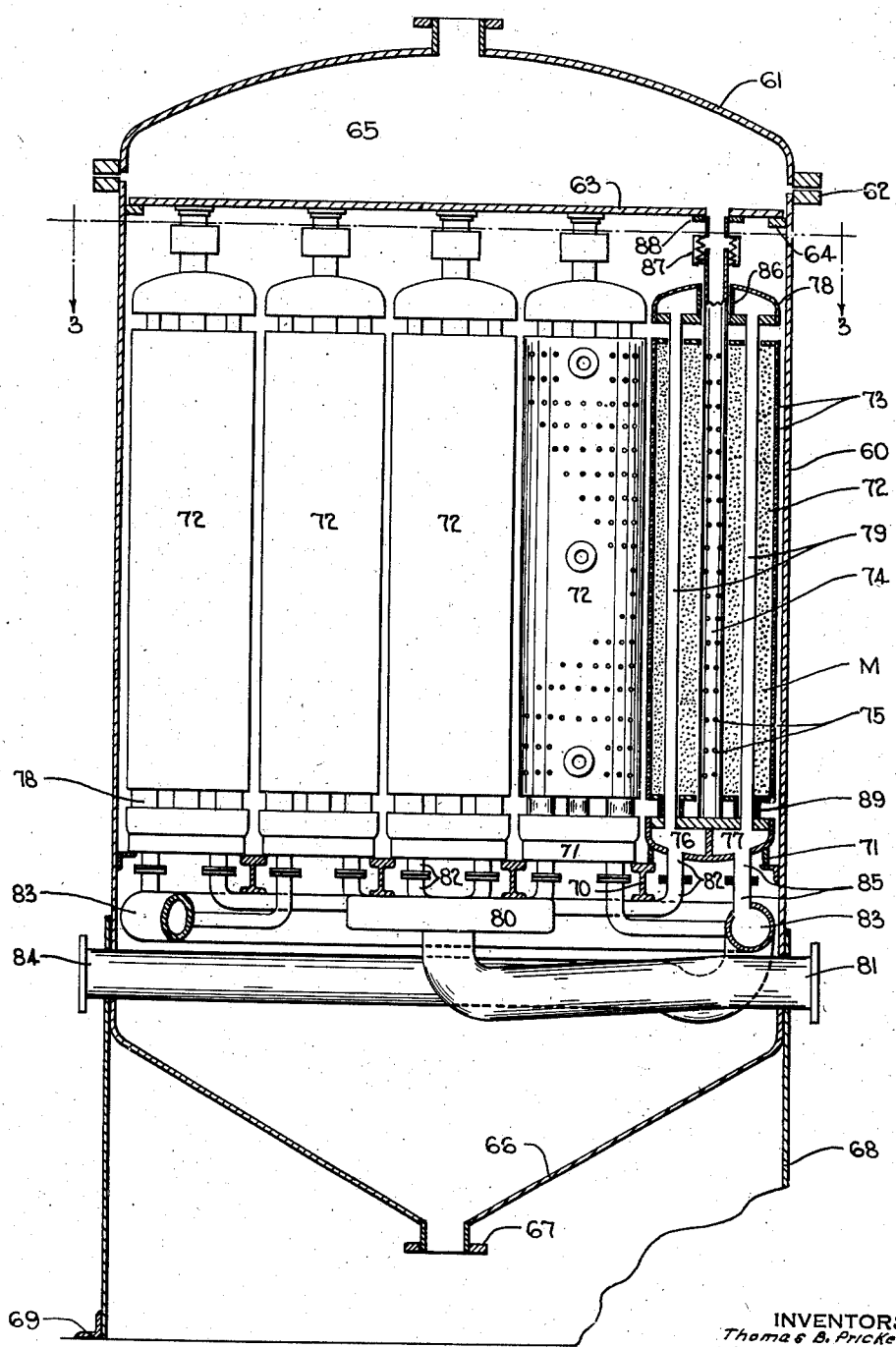
Fig. 5 is a sectional elevational view of a slightly modified converter with portions further sectioned to show details of a modified catalytic unit.

In Fig. 5 of the drawings a modified type of converter casing and of catalytic unit are shown. The casing 60 is, similarly to Fig. 1, provided with a cover 61 removably secured to flanges 62 and an apertured upper tube sheet 63, which is also removably secured to flanges 64 adjacent the top edge of the casing forming with the cover a manifold chamber 65. The bottom 66 of the casing is formed integrally with the side walls and provided with a fluid opening 67. A skirt portion 68 surrounds the lower end of the casing and has an outwardly extending flange 69 at its bottom for securing the casing in position. Supports in the form of I-beams 70 are secured to the inner wall of the casing adjacent its lower end, and extend thereacross to receive annular support-lugs 71. Catalytic units 72 in this form of apparatus are each made up of a single cell having perforations 73 in its side wall and centrally of each unit a fluid conduit 74 is provided having perforations 75 which cooperate with the perforations in the side wall of the cell in passing reactant fluid through the contact material M.

Each catalyst unit 72 is provided with its separate heat exchange system to afford a multiple passage of the heat exchange fluid through the contact material. The system comprises an inlet manifold 76 and an outlet manifold 77 positioned at the lower end of each unit which are interconnected by an upper manifold 78 and a plurality of heat exchange tubes 79 permitting the heat exchange fluid to pass upwardly through the contact material through the tubes in communication with the inlet manifold 76 and downwardly through the material through the tubes in communication with the outlet manifold 77. The support lugs 71 may be fixed to the fluid manifolds 76 and 77 for positioning the units on I-beams 70. An inlet header 80 and main 81 are provided for supplying the fluid to the inlet manifolds 76 through flanged conduits 82, and an outlet header 83 and main 84 are provided for removing the fluid from the outlet manifold 77 through flanged conduits 85. For the removal and/or replacement of any catalytic unit suitably arranged valves (not shown) are provided in conduits 82 and 85 for cutting the unit out of the heat exchange fluid circulating system as a preliminary step to breaking the flanges in these conduits.

In order to provide for expansion and contraction of the various parts of each unit the heat exchange tubes 79 pass through the upper and lower ends of each cell in freely sliding relation and are rigidly held by the upper and lower manifolds, while the reactant fluid tubes 74 similarly pass through the upper and lower ends of the cell in freely sliding relation and may have their lower ends resting on or welded to the upper walls of the lower manifolds 76 and 77 and their upper ends extending through a central sleeve 86 in the upper manifold 78 in free sliding relation and are provided above the upper manifolds with an expansion joint 87. The tubes may also have flanges 88 for removably securing the same about the apertures in the tube sheet 63. The inlet and outlet heat exchange manifolds 76 and 77 are spaced from the lower end of each cell by rings 89 while the upper manifolds 78 are held in spaced relation with the upper ends of each unit by the tubes 79 in order to directly affect the end walls of the units by the temperature of the reaction fluid or reaction products.

In operation, reaction fluid may be supplied directly to the pasageways surrounding the catalyst units, in Fig. 1, for example, through an opening in the converter side wall or as in Fig. 5 through the opening 67 in the lower end wall, and enter the cells of the catalytic units simultaneously through the perforations in their outer walls while the reaction products will be picked up by the apertured central conduits 30 of Fig. 1 or 74 of Fig. 5 and withdrawn through the manifold chambers 7 or 65 respectively of these figures. Or the reactant fluid may be supplied to the central conduits of the units of these figures from the manifolds 7 or 65 and pass through the apertures in the conduits into the contact material while the reaction products may be picked up by the spaces surrounding the units and withdrawn through the opening in the converter side wall of Fig. 1 or opening 67 of Fig. 5. In either mode of operation the reactant fluid or the reaction products will directly affect the temperature of each unit and since each unit will be entirely surrounded by the fluid they will remain substantially unaffected by any outside temperature conditions. The reaction tempearture of each unit may then be positively controlled by a suitable heat exchange medium. Such heat exchange medium may be gaseous or liquid, single phase or two actions having a sealed reactant chamber, a catalyst unit comprising a plurality of spaced superposed cells secured together in spaced relation and positioned within said sealed chamber, each cell having side and end walls ond a pair of partitions extending transversely thereacross providing a manifold within each cell, a plurality of aligned apertures in said end and transverse walls of each cell, a reactant conduit common to all the cells and extending through a set of aligned apertures in the end and transverse walls of each cell in loosely fitting relation therewith, said conduit having apertures spaced to be in communication with the manifold of each cell, means in communication with said sealed chamber and other means in communication with said conduit for passing fluid to and removing fluid from said catalyst unit, a heat exchange system comprising adjacent upper and lower fluid manifolds disposed below said catalyst unit, a set of outer heat exchange tubes common to all the cells of the catalyst unit and extending through other sets of aligned apertures in the walls of the cells in loosely fitting relation therewith and each tube having one closed end extending into the contact material and an open end in communication with the upper manifold, a set of inner heat exchange tubes each having one open end extending into the outer tubes and having the other open end in communication with the lower manifold.

6. In a converter having side and end walls, a partition extending transversely thereof forming a reaction chamber and a reactant manifold outwardly thereof, apertures in said partition and end wall of said reaction chamber, a plurality of separate and removable containers for holding contact material positioned in the chamber each having side and end walls, a reactant conduit extending across each container through an end wall, each conduit having an apertured area within each container and each conduit extending through an aperture in said partition providing communication with said manifold, means securing each conduit in sealing engagement and movable relation with the partition, said containers having apertured walls for cooperating with the apertures of the said conduits in passing fluid through the contact material in the containers between the reactant chamber and said manifold, a heat exchange unit comprising inner and outer manifolds positioned exteriorly of the other end wall of the containers and heat exchange tubes in communication with the manifolds and extending into the containers, said outer manifold of each heat exchange unit being positioned directly over an aperture in the reaction chamber end wall in tight sealing engagement therewith.

7. A converter for carrying out chemical reactions having a sealed reactant chamber, a plurality of independent containers for contact material positioned within said chamber in spaced relationship, reactant conduits extending across said containers through an end wall thereof, said containers being apertured and said conduits having an aperture within the containers for passing reactants through contact material in the containers, fluid conducting means in communication with the sealed reactant chamber and other means in communication with the reactant conduits for supplying fluid to and removing fluid from said containers, in combination with means for passing heat exchange fluid in indirect heat exchange relation with the contact material in the containers which comprises inlet and outlet manifolds positioned exteriorly of the containers and imperforate tubular members in communication with said manifolds and extending through the contact material in the containers.

8. A converter for carrying out chemical reactions having a sealed reactant chamber, a container for holding contact material having side and end walls and positioned within said sealed reactant chamber, a pair of transverse partitions extending across the container providing a manifold therebetween, aligned apertures in said end walls and transverse partitions, a reactant conduit extending through an aperture of each of said walls in loosely fitting relation therewith and having an aperture in communication with said manifold, fluid conducting means in communication with said sealed chamber and other fluid conducting means in communication with said conduit for passing fluid to and removing fluid from said container, a heat exchange unit having inlet and outlet manifolds positioned exteriorly of said container, and tubes extending through other apertures in said end walls and interconnecting said manifolds.

9. A converter having side and end walls, an apertured partition extending thereacross forming a reaction chamber and a reactant manifold, a container for contact material disposed in said chamber, said container comprising a rigid apertured bottom wall and side walls, a pair of upper and lower transverse apertured partitions and an apertured top end wall extending across the container in freely moving relation with the side walls, a bed of contact material supported by said rigid bottom wall, said bed supporting said lower transverse partition, means on the end bottom wall supporting said upper transverse partition in spaced relation with the lower transverse partition, providing a reactant manifold, a bed of contact material supported by said upper transverse partition, said last mentioned bed supporting said top end wall, a conduit extending through said apertured transverse partitions and end walls in loosely fitting relation therewith, said conduit having an aperture in communication with said reactant manifold, means in communication with said sealed chamber and other means in communication with said conduit for passing reactants through the contact material in the container, a heat exchange unit comprising an inner and outer manifold disposed exteriorly of said container, a set of closed end heat exchange tubes extending through other apertures in said container walls in loosely fitting relation therewith, each tube having its closed end within the container and its open end in communication with said inner manifold, a set of open end heat exchange tubes, each having one open end within the outer tubes and one open end in communication with the outer manifold.

THOMAS B. PRICKETT.
ERNEST S. UTTERBACK.